(12) United States Patent
Sonnendorfer et al.

(10) Patent No.: US 8,167,095 B2
(45) Date of Patent: May 1, 2012

(54) IMMOBILIZER

(76) Inventors: Horst Sonnendorfer, Puchheim (DE);
Franz Wieth, Puchheim (DE)

( * ) Notice: Subject to any disclaimer, the term of this patent is extended or adjusted under 35 U.S.C. 154(b) by 263 days.

(21) Appl. No.: 12/447,325

(22) PCT Filed: Oct. 25, 2007

(86) PCT No.: PCT/DE2007/001910
§ 371 (c)(1),
(2), (4) Date: Jun. 2, 2009

(87) PCT Pub. No.: WO2008/049417
PCT Pub. Date: May 2, 2008

(65) Prior Publication Data
US 2010/0012438 A1    Jan. 21, 2010

(30) Foreign Application Priority Data
Oct. 26, 2006  (DE) .................. 20 2006 016 576 U

(51) Int. Cl.
*B62B 5/04*  (2006.01)
(52) U.S. Cl. .................. 188/19; 188/1.12; 16/35 R

(58) Field of Classification Search ............... 188/19, 188/20, 21, 31, 69, 9, 1.12; 16/35 R; 280/33.994
See application file for complete search history.

(56) References Cited

U.S. PATENT DOCUMENTS

| | | | |
|---|---|---|---|
| 1,895,150 A | 1/1933 | Darnell | |
| 5,012,550 A | 5/1991 | Schlösser | |
| 5,509,506 A * | 4/1996 | Jones | 188/1.12 |
| 5,675,864 A * | 10/1997 | Chou | 16/35 R |
| 2007/0013155 A1 | 1/2007 | Wieth et al. | |

FOREIGN PATENT DOCUMENTS

| | | |
|---|---|---|
| DE | 4128729 A1 | 3/1993 |
| EP | 0413197 A1 | 2/1991 |
| WO | 2005028278 A2 | 3/2005 |

\* cited by examiner

*Primary Examiner* — Pamela Rodriguez
(74) *Attorney, Agent, or Firm* — Laurence A. Greenberg; Werner H. Stemer; Ralph E. Locher

(57) ABSTRACT

Immobilizer for shopping trolleys, wherein the castor angle of the steering rollers when the immobilizer is activated is equal to zero, as a result of which the steering rollers can set themselves stochastically to an oblique or transverse position with respect to the direction of travel, making the shopping trolley much more difficult to push.

2 Claims, 2 Drawing Sheets

# IMMOBILIZER

TECHNICAL FIELD

The invention relates to an immobilizer for shopping trolleys.

PRIOR ART

The prior art discloses a large number of immobilizers which are intended to prevent a trolley from being able to be used outside a permissible region.

One of the known immobilizers is described in WO2005 028278. In that document, the steering angle of the transportation rollers of the trolley is locked in different angular positions with the aid of a mechanical apparatus after the immobilizer is activated.

The mechanical apparatus described in that document comprises a pawl-like unit which allows the steering angle to change only in one direction of rotation and thus prevents the steering angle from returning to the position required for traveling in a straight line as soon as said steering angle has changed.

In this known apparatus, the steering angles are changed by making use of the fact that the steering angles continuously assume a new value when the trolley is traveling around a bend.

If the user of the shopping trolley attempts to maneuver the shopping trolley when the immobilizer is activated, each operation of traveling around a bend causes the steering angle to change, but it then cannot return to the position required for traveling in a straight line.

One disadvantage of the known solution is that the customer can now travel a certain further distance with the shopping trolley provided that he does not travel around a bend. The shopping trolley can therefore be used for a certain further distance, depending on the local conditions, before the steering angles of the individual transportation rollers are locked at different angles.

DISCLOSURE OF THE INVENTION

Technical Object

The object of the invention is to provide an immobilizer in which the steering angles are rapidly inclined after activation, independently of the steering movements of the user.

Technical Solution

The considerations which led to the creation of the present invention adopted the knowledge that a steering roller assumes a defined position when a trolley is being pushed only on account of a so-called caster angle.

A caster angle is understood to mean the distance of the standing area from the rotation axis of the transportation roller. This caster angle ensures that the rolling resistance which is produced at the standing area has an effect on a torque about the steering axis which orients the transportation roller such that it is possible to push the shopping trolley in a targeted manner.

In a transportation roller which does not have a caster angle, that is to say the steering axis runs substantially through the standing area of the transportation roller, no such torque, which then orients the transportation roller, is produced when the shopping trolley is being pushed.

A small resistance, for example an unevenness in the carriageway which occurs in the region of the standing area when the shopping trolley is being pushed, generates a stochastically occurring torque about the steering axis.

This torque moves the transportation roller at a steering angle which differs from the pushing direction and which, for its part, again has a stochastic value.

ADVANTAGEOUS EFFECTS

This advantageously has the effect that, when the immobilizer is activated, each wheel faces a different direction and it is therefore extremely difficult to push said trolley and, in particular, a straight distance cannot be covered.

Figure 1:
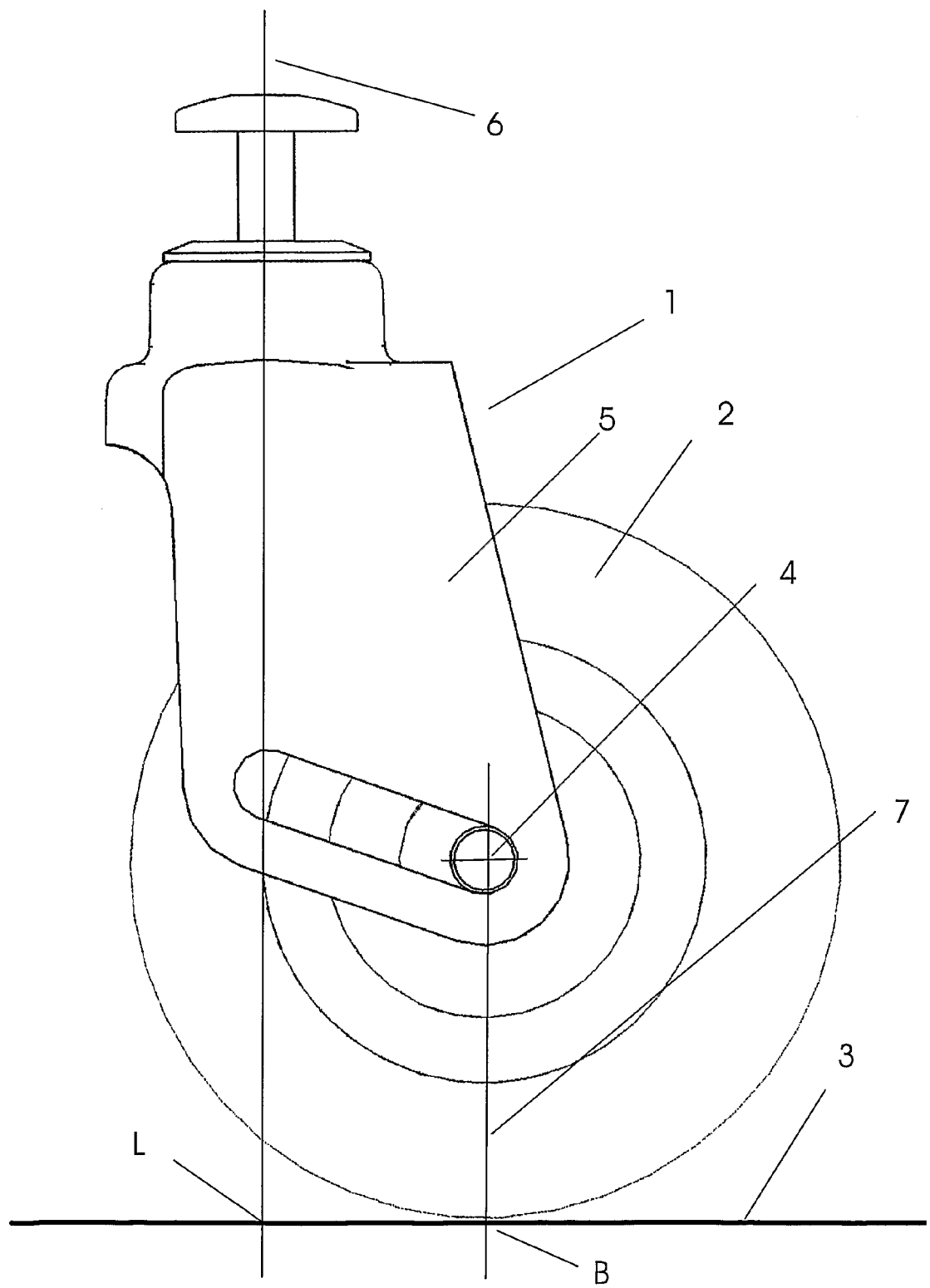
FIG. 1 shows a transportation roller in the normal state.

The transportation roller 1 comprises a wheel 2 which travels on the carriageway 3. The wheel 2 is mounted in a steering limb 5 by means of a wheel shaft 4. The steering limb 5 can rotate about a rotation axis 6. The wheel is substantially in contact with the region B of the carriageway which is located in the vicinity of the location at which the vertical line 7 from the center point of the wheel shaft 4 passes through the plane of the carriageway.

The rotation axis 6 passes through the carriageway 3 at the location L which is situated outside the region B. The force which is produced between the carriageway 3 and the wheel 2 when the shopping trolley is being pushed then generates a torque about the rotation axis 6 which leads to it being possible to orient the wheel parallel to the pushing direction and to follow the steering movements when the shopping trolley is being steered.

Figure 2:
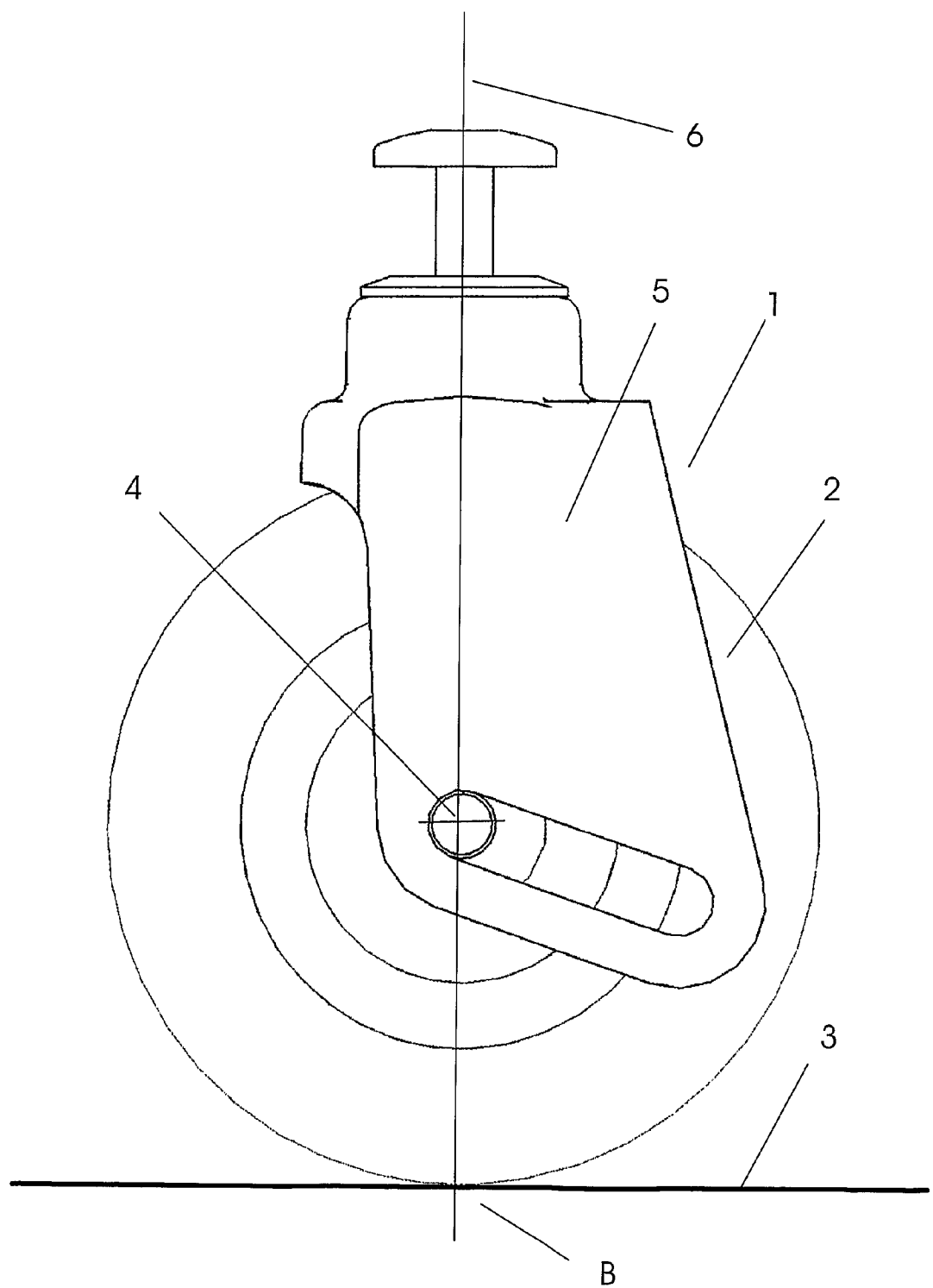
FIG. 2 shows the transportation roller when the immobilizer is activated.

FIG. 2 shows the transportation roller when the immobilizer is activated. The immobilizer was activated by a mechanism which is not shown in any detail here. The center axis of the shaft 4 and the steering axis 6 intersect or are at only a very small distance from one another, this distance also being attributed to manufacturing tolerances.

The steering axis 6 now passes through the carriageway in the region B in which the wheel 2 touches the carriageway.

When the trolley is being pushed, no torque, which would lead to the wheel 2 being oriented in the direction of travel or in the steering direction, occurs, in accordance with the invention.

However, a further effect is produced, this effect therefore causing the wheel 2 to touch the carriageway in the region of an area and causing the steering axis 6 to pass through this area at one point.

As soon as there is a small unevenness in the carriageway 3 and the wheel strikes this unevenness, this leads to an accidental rotation of the wheel about the steering axis. The direction and the magnitude of this rotation are dependent only on the distance of the unevenness from the point at which the steering axis 6 passes through the carriageway 3.

INDUSTRIAL APPLICABILITY

The invention is industrially applicable, for example, in shopping trolleys which are provided by a supermarket operator on a refund basis and in the case of which the shopping trolleys are to be prevented from being used away from the site of said supermarket.

The invention claimed is:

1. A trolley, comprising:

an immobilizer having a deactivated state which permits the trolley to be used and an activated state which prevents the trolley from being used outside a permissible region, the immobilizer having a steering axis and having a transportation roller which is rotatable in both the activated and deactivated states of the immobilizer and touches a carriageway by way of a standing area, and the transportation roller has a caster angle in the deactivated state of the immobilizer, said caster angle being produced by a distance being present between a location at which the steering axis intersects the carriageway and the standing area of the transportation roller on the carriageway, when the immobilizer is activated, geometric relationships between the location at which the steering axis intersects the carriageway and the standing area are changed such that the location at which the steering axis intersects the carriageway runs substantially in the standing area of the transportation roller.

2. A trolley, comprising:

an immobilizer having a deactivated state which permits the trolley to be used and an activated state which prevents the trolley from being used outside a permissible region;

the immobilizer having a steering axis and a transportation roller which touches a carriageway by way of a standing area; and the transportation roller has a caster angle in the deactivated state of the immobilizer, said caster angle being produced by a distance being present between a location at which the steering axis intersects the carriageway and the standing area of the transportation roller on the carriageway;

when the immobilizer is activated, geometric relationships between the location at which the steering axis intersects the carriageway and the standing area are changed such that the location at which the steering axis intersects the carriageway runs substantially in the standing area of the transportation roller; and when the immobilizer is activated, due to the geometric relationships, the wheel rotates about the steering axis upon the wheel striking an unevenness in the carriageway, causing the wheel to face in a different direction than other wheels and prevent the trolley from being used.

* * * * *